Aug. 12, 1952      L. SEABECK      2,606,386
FISHING LURE
Filed July 12, 1949      2 SHEETS—SHEET 1
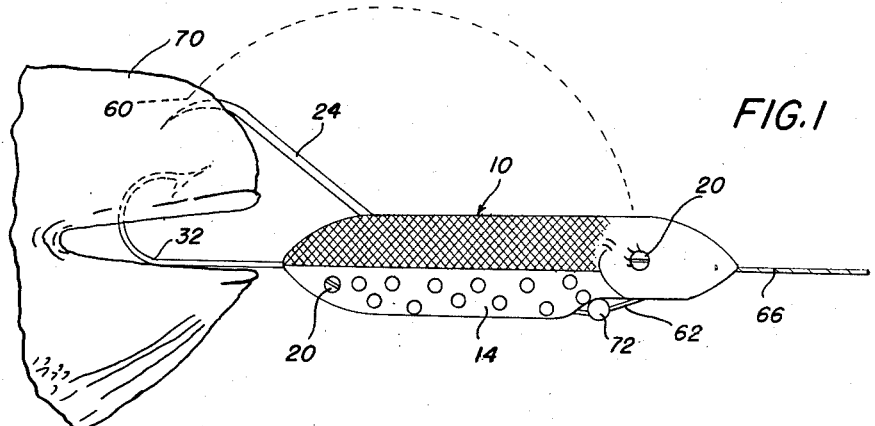
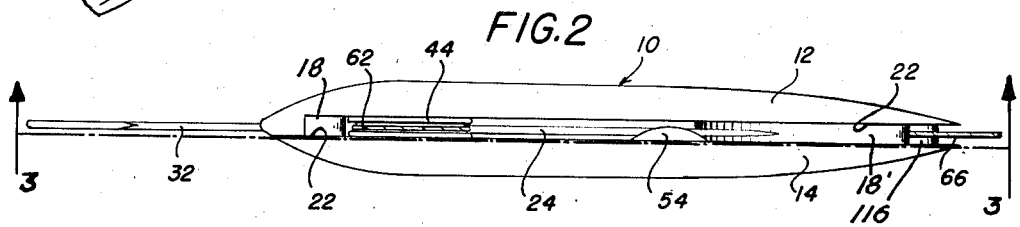
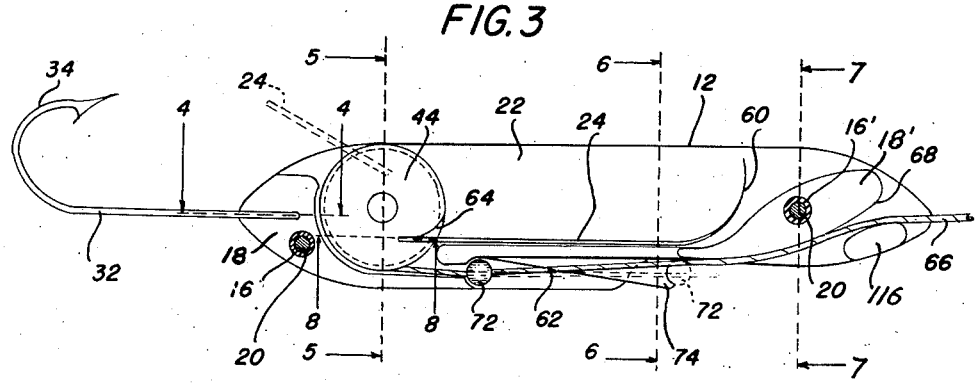
INVENTOR:-
LENNART SEABECK
BY
Lindsey, Prutyman & Just
ATTYS, Aug. 12, 1952     L. SEABECK     2,606,386
FISHING LURE
Filed July 12, 1949     2 SHEETS—SHEET 2
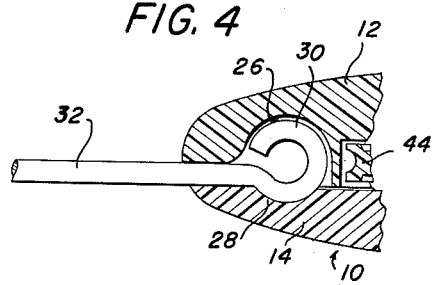
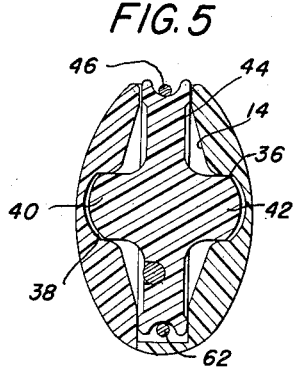
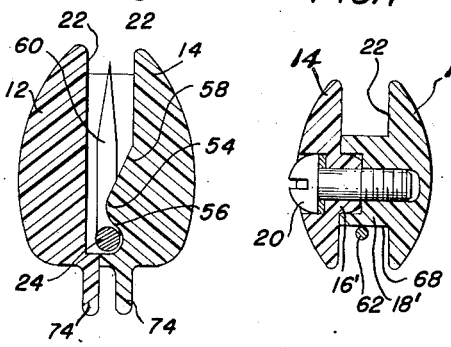
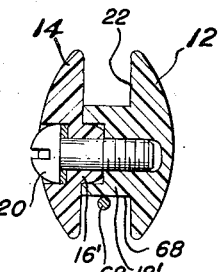
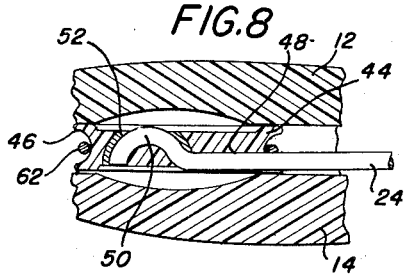
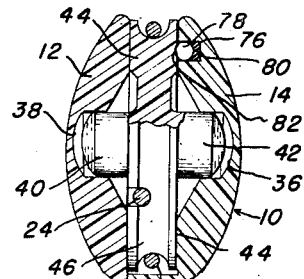
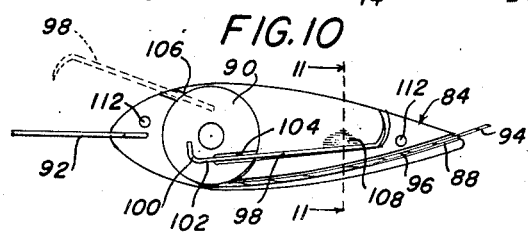
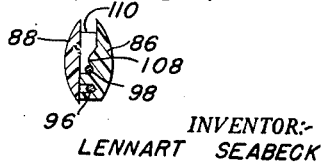
INVENTOR:-
LENNART SEABECK
BY
Lindsey Pritzman Just
ATTYS.

Patented Aug. 12, 1952

2,606,386

UNITED STATES PATENT OFFICE 2,606,386

FISHING LURE

Lennart Seabeck, Rocky Hill, Conn.

Application July 12, 1949, Serial No. 104,259

4 Claims. (Cl. 43—35)

This invention relates to improvements in a fishing lure of the head lock type. A lure of this type is attached to the end of a fishing line and, under usual circumstances, the lure is pulled through fish inhabited waters such as when trolling. The lure comprises artificial bait and is generally decorated on its exterior to resemble a small fish. A live fish, upon seeing the lure, will strike at it, generally approaching the lure from the rear or trailing end of the lure which has a fish hook attached thereto. The live fish attempts to strike and swallow the lure. Upon doing so and finding the hook thereon stuck in its mouth, the live fish will attempt to disengage itself from the lure and hook by shaking itself loose therefrom and frequently is successful in doing so.

It is an object of this invention to prevent disengagement of a live fish from a fishing lure of this type by providing a head lock arrangement in the nature of a holding hook which will automatically be moved from a concealed or retracted position within the lure to a holding position adjacent the fish hook of the lure, the holding hook engaging the exterior of either the upper or lower jaw portion of the head of the fish so as to hold the fish hook of the lure in engagement with the interior of the mouth of the fish to prevent it from shaking itself free from the hook of the lure.

It is another object of the invention to provide the lure with means which will retain the holding hook in concealed and retracted position until a predetermined amount of force is applied to the lure as a result of a fish pulling upon the hook thereof in opposition to the force imposed upon the lure by the line to which it is secured, the retaining means then being overcome and the holding hook being moved to holding position adjacent the fish hook of the lure.

A further object of the invention is to provide several different embodiments of means for releasably retaining the holding hook in holding position after it has been moved thereto by a predetermined amount of force being applied to the fishing line connected to the lure after a fish has engaged the fish hook of the lure.

Still another object of the invention is to provide within the lure a rotatable pulley around a portion of which a lead is wound, whereby when the lead is moved relative to the lure by force being applied to the line connected to the lead, the pulley will be rotated, and a holding hook secured to said pulley will then be swung from its retracted position to its holding position adjacent the fish hook of the lure.

Still other objects of the invention are to provide unique arrangements for forming and connecting the body of the lure as well as securing a fish hook to the trailing end thereof so as to produce a compact, rugged and inexpensive lure capable of achieving the foregoing objects.

Details of these objects and of the invention as well as other objects thereof are set forth in the following specification and illustrated in the drawings forming a part thereof.

In the drawings:

Fig. 1 is a side view of a lure embodying principles of the invention, the lure being shown in engagement with the mouth of a fish and the holding hook of the lure being in holding position in this figure.

Fig. 2 is a top plan view of the lure shown in Fig. 1, the same being shown on a larger scale than in Fig. 1.

Fig. 3 is a sectional view of the lure taken on the line 3—3 in Fig. 2 and illustrating in full lines the position of the holding hook in retracted position, and in dotted lines the position of the holding hook when in its holding position.

Fig. 4 is a further enlarged fragmentary sectional view taken on the line 4—4 of Fig. 3.

Fig. 5 is an enlarged vertical sectional view taken on the line 5—5 of Fig. 3.

Fig. 6 is a vertical sectional view taken on the line 6—6 of Fig. 3.

Fig. 7 is a vertical sectional view taken on the line 7—7 of Fig. 3.

Fig. 8 is a horizontal fragmentary sectional view taken on the line 8—8 of Fig. 3.

Fig. 9 is a sectional view similar to Fig. 5 but showing a modified form of means for releasably holding the pulley and holding hook in either the retracted or holding positions thereof.

Fig. 10 is a side sectional view similar to Fig. 3 but showing another embodiment of the invention.

Fig. 11 is a sectional view taken on the line 11—11 of Fig. 10.

Referring to the drawings, the lure comprises a body 10 formed by connecting together two connected side members 12 and 14. Said side members may be formed from any suitable material such as by die casting aluminum, molding synthetic resin, or the like. The side members are preferably provided at adjacent opposite ends with interfitting male and female bosses or lugs 16 and 18 and 16′ and 18′ illustrated in detail in Fig. 2 or 7. Suitable apertures are provided in said side members to receive connecting screws 20 which detachably secure the side members in engagement with each other. The interfitting bosses 16 and 16' and 18 and 18' provide self-aligning means for the side members whereby assembly of the body is inexpensive and easily performed. Extending longitudinally of the side members are complementary cavities which cooperate to form a longitudinal slot or recess 22 which is primarily for purposes of holding in concealment a stiff but slightly flexible holding hook 24.

The side members are also formed with complementary cooperating cavities 26 and 28 suitably shaped to accommodate the looped end 30 of a conventional fish hook 32. The looped end 30 of the fish hook is inserted in one of the cavities prior to connecting side members 12 and 14 together. Assembling the side members, therefore, automatically locks the looped end 30 of the fish hook in operative position and the shape of the cavities 26 and 28 is such as to closely engage the outer surface of said looped end 30 and thereby prevent any appreciable movement of the fish hook 32 relative to the body 10. In uniting the body 10 and fish hook 32, however, the same are preferably united in the relative positions thereof shown in Fig. 3 so that the hook end 34 of the fish hook 32 extends laterally from the shaft portion of the hook in the same direction as the open side of the longitudinal recess 22 in the body 10.

Extending inward from the inner surfaces of the side members 12 and 14 are a pair of axially aligned, facing, cylindrical recesses 36 and 38 which comprise opposed bearings for rotatably receiving respectively one of a pair of axially aligned trunnions 40 and 42 which project from opposite sides of a disc-like member formed as a pulley 44. The pulley is provided with an annular groove 46. Said pulley is also provided with a suitable cavity 48 in which a bent end 50 of the holding hook 24 is positioned. Said end 50 may be secured to the pulley by any suitable means such as solder 52, whereby the holding hook 24 is integral with the pulley. If desired, however, the holding hook may be united with the pulley by molding the pulley while the bent end 50 thereof is held in situ within the mold cavity.

Projecting form the inner surfaces of the side member 14 is a land or retaining detent 54, a sectional view thereof being shown to advantage in Fig. 6. The innermost camming surface 56 of the detent 54 is more abrupt than the other camming surface 58 thereof. As stated above, the holding hook 24 is stiff but slightly resilient so that the inherent resiliency thereof will normally hold an intermediate portion of said holding hook against the camming surface 56 of detent 54 and thus hold the holding hook in its retracted position within the longitudinal recess 22 as illustrated in Fig. 3. Preferably, the outer end 60 of the holding hook does not project beyond the upper edge of the recess 22 when in its retracted position.

Partially surrounding the annular groove 46 of the pulley 44 is a flexible lead 62 which may be formed from suitable material such as braided "Morsel" wire. The inner end 64 of the lead is fastened to the pullley 44 and the other end 66 is guided through a suitable channel 68 terminating at the forward end of the body 10 of the lure. Said other end 66 of said lure is secured to the end of a fish line in any suitable manner. When the holding hook 24 is in its retracted position illustrated in Fig. 3, the resilience thereof is such that a substantial amount of force may be applied to the end 66 of the lead by the attached line before the holding hook 24 will be caused to flex so as to slide up the innermost surface 56 of the detent 54 as a result of the rotative force applied to the pulley 44 by the lead 62. Thus, when a fish 70 strikes the lure and becomes attached to the fish hook 32 thereof as illustrated in Fig. 1, the fish, in pulling against the hook 32, will impose a tension force upon the lead 62 and, when said force becomes sufficiently great, the holding hook 24 will be flexed past the detent 54 and continued application of force on the lead 62 will cause the pulley 44 to rotate counterclockwise, as shown as Fig. 3, and thereby swing the holding hook 24 to the holding position thereof illustrated in Fig. 1. In this position, the outer end 60 of the holding hook will engage the fish's head and hold it in engagement with the fish hook 32 so as to prevent the fish from disengaging itself from said fish hook.

For purposes of retaining the hook 24 in holding position, the embodiment of the invention shown in Figs. 1 and 3, contemplates the use of releasable locking means comprising a spherical member 72 fixed, by molding or otherwise, to the lead 62 intermediate the ends thereof. When the holding hook 24 is in retracted position, the member 72 is in the position shown in full lines in Fig. 3, adjacent the pulley 44. However, after the holding hook 24 is moved to its holding position shown in dotted lines in Fig. 3, the member 72 will be disposed in the dotted line position thereof shown in Fig. 3, and in which position it will be disposed behind a pair of spaced shoulders or projections 74 to prevent movement of the holding hook from its holding position. The projections 74 have cooperating curved walls defining a seat complementary to said member 72, as clearly shown in Fig. 3.

When a fish strikes the fish hook 32 of the lure and the holding hook is disengaged from its locking detent 54, movement of the holding hook 24 to its holding position is rapid and the tension applied to the lead 62 is sufficiently great so that the member 72 will quickly snap into engagement against the projections 74. The engagement of the holding hook 24 with the head of the fish will tension the lead 62 and serve to retain the member 72 in locked position against the projections 74. After a fish has been landed, the holding hook may be easily removed from its head by first disengaging the member 72 from the projections 74 and then swinging the holding hook to its retracted position shown in full line in Fig. 3. To insure locking engagement between the locking member 72 and the projections 74, the ends of the latter engaged by the member 72 are preferably arcuate to conform to the shape of the member 72 as is clearly evident from Fig. 3.

The aforementioned channel 68 through which the lead 62 extends is defined by the boss or lug 18' and lug 116 which project from the side member 12 a distance equal to the width of recess 22. Lug 18' may be provided with an annular recess 16' to receive a boss 16 projecting from the side of member 14 which defined one side of recess 22. When the side member 12 and 14 are assembled, the free ends of lugs 18' and 116 preferably abut the inner wall of side member 14 to define the channel 68 which guides lead 62. The diameter of spherical member 72 is greater than the transverse dimension of channel 68. Thus, should lead 62 become broken between the member 72 and the end thereof engaging pulley 44, the member 72 will engage the walls of channel 68 and prevent the loss of the lure from the fish line.

In Fig. 9, another embodiment of retaining means is shown for releasably locking or retaining the holding hook in either its retracted or holding positions. In this figure, it will be noted that the side member 14 is provided on its inner surface with a cylindrical recess 76 in which a biased detent comprising a ball 78 is positioned and a small piece of resilient material 80, such as artificial rubber which will not readily deteriorate when exposed to water, is positioned between the ball and the base of the recess 76 so as to bias the ball 78 outward of the recess. One side of the pulley 44 is provided with several semi-spherical or cylindrical cavities 82 which are arranged respectively to receive the projecting portion of the ball 78 when the holding hook 24 is in either its retracting or holding positions. Obviously, if desired, the ball 78 and its mounting means could be carried by the pulley 44 and the spaced cavities 82 could be formed in either of the side members 12 or 14.

Referring to Figs. 10 and 11, another type of lure embodying the principles of the present invention is illustrated. This embodiment readily lends itself to being made in a smaller size than that illustrated in the other figures but the structure of this embodiment is not restricted to use in small sized lures. In this embodiment, the body 84 comprises side members 86 and 88 which are formed from material used and by methods employed in making side members 12 and 14 of the embodiment shown in the other figures. A pulley 90, similar to the pulley 44 of said other embodiment, is pivotally mounted in the body 84 and a fish hook 92 is also attached to one end of body 84 by means similar to those employed relative to fish hook 32 in the other embodiment. Pulley 90, being pivotally mounted in body 84 by means similar to those used with pulley 44, is constructed to be rotated by means of a lead 94 which is wound at least part way around the pulley 90 and extends through elongated channel 96 formed in side member 86 of the body 84. The extending end of lead 94 is attached to the end of a fish line so that force may be applied to the lead 94 in order to rotate the pulley 90 and cause the holding hook 98, fixed to the pulley, to be moved counterclockwise as viewed in Fig. 10 until the outer end of the holding end is disposed adjacent the outer end of fish hook 92.

The secured end 100 of holding hook 98 is mounted in an L-shaped opening 102 within the pulley 90 so as to fix the holding hook to the pulley. The holding hook and pulley may be united, for example, by molding the pulley in suitable molds while the end 100 of the holding hook is held in situ within said mold. The opening 102 within which the end 100 of the holding hook is secured terminates in an enlarged portion 104 so that the portion of the holding hook 98 adjacent the periphery of said pulley may flex a limited amount relative thereto. This is for purposes of permitting the holding hook to snap into a locking or retaining notch 106 formed in side member 88 as shown in Fig. 10. Said notch thereof serves to releasably retain the holding hook in its holding position.

A retaining detent 108, similar to detent 54 in the other embodiment, retains the holding hook in its retracted position within the longitudinal recess 110 in body 84 until a predetermined force is applied to lead 84 for purposes of flexing holding hook 98 past the apex of retaining detent 108 to permit the holding hook to be swung to its holding position illustrated in dotted lines in Fig. 10. As in the embodiment shown in the other figures, the side members 86 and 88 may be secured together by suitable rivets or screws 112.

While the invention has been illustrated and described in its preferred embodiments and has included certain details, it should be understood that the invention is not to be limited to the precise details herein illustrated and described since the same may be carried out in other ways, falling within the scope of the invention as claimed.

I claim as my invention:

1. A fishing lure comprising a slotted body, a fish hook secured to one end of said body, a holding hook pivotally supported by said body and arranged to be swung from inoperative position within the slot in said body position to a holding position adjacent said fish hook, holding means carried by said body and engageable with said holding hook releasably to retain it in said inoperative position, a lead interconnected to said holding hook and connectible to a fishing line, said lead being operable by a pull imposed thereupon by said line to disengage said holding hook from said holding means and swing it to its holding position, and locking means comprising a member carried by said lead and engageable with means fixed relative to said body when said holding hook is in its holding position to maintain said holding hook in said position.

2. A fishing lure comprising a body having a slot extending longitudinally and inward from one edge thereof, a fish hook secured to and extending from one end of said body, a pulley pivotally supported by said body within said slot for rotation about an axis transverse to the longitudinal axis of said body, a holding hook secured to said pulley and arranged to be swung thereby from a concealed retracted position within said slot to a holding position adjacent said fish hook; a lead connectible at one end to the end of a fishing line and at the other end at least partially surrounding said pulley, whereby a pull imposed upon said lead by said line serves to rotate said pulley and carry said holding hook to its holding position, and a cam surfaced detent projecting from one wall of said slot and engageable with said holding hook when in its retracted position within said slot to releasably retain said holding hook in said retracted position until a predetermined force is applied to the lead by said fishing line, said holding hook being arranged to be flexed past said detent when said predetermined force is imposed upon said lead, whereby said holding hook will be freed from engagement with said detent retaining means and the force imposed upon said lead will rotate said pulley to move the holding hook to its holding position.

3. A fishing lure comprising a body having spaced lugs adjacent one end defining a guideway, a fish hook secured to and projecting from the other end of said body, a holding hook pivotally supported by said body and arranged to be swung from inoperative position within said body to a projected holding position adjacent said fish hook, a flexible lead extending through said guideway and interconnected to said holding hook and also connectible to a fishing line, said lead being operable by a pull imposed thereupon by said line to swing said holding hook from its inoperative to its holding position, and a member connected to said lead between said holding hook and guideway and having a larger transverse dimension than said guideway, whereby said member will not pass through said guideway and will prevent separation of said lure from said line should said lead be broken between said member and holding hook.

4. A fishing lure comprising a body, a fish hook secured to one end of said body, a holding hook pivotally supported by said body and arranged to be swung from inoperative position to a holding position adjacent said fish hook, a flexible lead interconnected to said holding hook and connectible to a fishing line, said lead being operable by a pull imposed thereupon by said line to swing said holding hook from its inoperative to its holding position, a spherical member fixed to said lead intermediate the ends thereof, and a pair of spaced projections extending from said body and receiving said lead therebetween, said projections having cooperating curved walls defining a seat engageable by said spherical member when said holding hook is moved by said lead to holding position and operable to prevent movement of said holding hook from said holding position.

LENNART SEABECK.

REFERENCES CITED

The following references are of record in the file of this patent:

UNITED STATES PATENTS

| Number | Name | Date |
| --- | --- | --- |
| 562,851 | Prosser | June 30, 1896 |
| 929,914 | Chesser | Aug. 3, 1909 |
| 963,202 | Bohannan | July 5, 1910 |
| 1,158,666 | Evans | Nov. 2, 1915 |
| 1,393,617 | Frame | Oct. 11, 1921 |
| 1,568,325 | Dewey | Jan. 5, 1926 |
| 1,694,697 | Beidatsch | Dec. 11, 1928 |
| 1,758,160 | Lee | May 13, 1930 |